US011805510B2

(12) United States Patent
Kuo et al.

(10) Patent No.: US 11,805,510 B2
(45) Date of Patent: *Oct. 31, 2023

(54) ENHANCED PUCCH FORMAT 0 AND FORMAT 1 DESIGN FOR NEW RADIO UNLICENSED SPECTRUM OPERATION

(71) Applicant: MediaTek Singapore Pte. Ltd., Singapore (SG)

(72) Inventors: Chun-Hsuan Kuo, San Jose, CA (US); Jiann-Ching Guey, Hsinchu City (TW); Chiou-Wei Tsai, Hsinchu City (TW); Cheng-Rung Tsai, Hsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,525

(22) Filed: Oct. 27, 2022

(65) Prior Publication Data
US 2023/0060370 A1  Mar. 2, 2023

Related U.S. Application Data

(63) Continuation of application No. 16/990,696, filed on Aug. 11, 2020, now Pat. No. 11,553,509.

(60) Provisional application No. 62/891,995, filed on Aug. 27, 2019.

(51) Int. Cl.
| | |
|---|---|
| *H04W 72/1263* | (2023.01) |
| *H04J 13/00* | (2011.01) |
| *H04W 16/14* | (2009.01) |
| *H04W 72/21* | (2023.01) |

(52) U.S. Cl.
CPC ........ *H04W 72/1263* (2013.01); *H04J 13/004* (2013.01); *H04W 16/14* (2013.01); *H04W 72/21* (2023.01)

(58) Field of Classification Search
CPC ............. H04W 72/1263; H04W 72/541; H04J 13/004; H04W 16/14
See application file for complete search history.

(56) References Cited

U.S. PATENT DOCUMENTS

| | | | | |
|---|---|---|---|---|
| 2018/0324762 | A1* | 11/2018 | Zhu et al. | ............. H04W 72/04 |
| 2021/0044981 | A1 | 2/2021 | Bhattad et al. | |
| 2022/0039134 | A1* | 2/2022 | Fong et al. | ........... H04W 72/20 |
| 2022/0279548 | A1* | 9/2022 | Lin et al. | ............. H04L 5/0055 |

OTHER PUBLICATIONS

Kundu, Lopamudra et al.; "Physical Uplink Control Channel Design for 5G New Radio"; 5G World Forum 2018.

* cited by examiner

*Primary Examiner* — Basil Ma
(74) *Attorney, Agent, or Firm* — Han IP PLLC; Andy M. Han (57) ABSTRACT

An apparatus (e.g., a user equipment (UE)) maps a plurality of mutually orthogonal sequences to each of a plurality of physical resource blocks (PRBs) within an interlace. The apparatus then performs a physical uplink control channel (PUCCH) transmission in a New Radio unlicensed spectrum (NR-U). The apparatus also receives an assignment of a set of sequences for each PRB of the plurality of PRBs from a wireless network. In response, the apparatus performs an uplink control information (UCI) transmission via the PUCCH in the NR-U.

10 Claims, 4 Drawing Sheets

FIG. 4

# ENHANCED PUCCH FORMAT 0 AND FORMAT 1 DESIGN FOR NEW RADIO UNLICENSED SPECTRUM OPERATION

CROSS REFERENCE TO RELATED PATENT APPLICATION

The present disclosure is part of a Continuation of U.S. Pat. Application No. 16/990,696, filed 11 Aug. 2020 and claiming the priority benefit of U.S. Provisional Pat. Application No. 62/891,995, filed 27 Aug. 2019. Contents of aforementioned applications are herein incorporated by reference in their entirety.

TECHNICAL FIELD

The present disclosure is generally related to mobile communications and, more particularly, to enhanced physical uplink control channel (PUCCH) format 0 and format 1 design for New Radio (NR) unlicensed spectrum (NR-U) operation.

BACKGROUND

Unless otherwise indicated herein, approaches described in this section are not prior art to the claims listed below and are not admitted as prior art by inclusion in this section.

In NR-U, PUCCH formats are mapped to an interlace. Additionally, in NR-U, there is a spectral power distribution (SPD) limitation of 10 dBm/MHz by the European Telecommunications Standards Institute (ETSI) for all PUCCH transmissions. Regarding PUCCH formats supported in NR-U, both enhanced PUCCH format 0 (e-PF0) and enhanced PUCCH format 1 (e-PF1) are for small uplink control information (UCI) payloads, and both enhanced PUCCH format 2 (e-PF2) and enhanced PUCCH format 3 (e-PF3) are for moderate to large UCI payloads. With respect to resource utilization efficiency, in NR, PUCCH format 0 (PF0) occupies 12 subcarriers in the frequency domain. In contrast, in NR-U, e-PF0 would be carried by an interlace that has 120 subcarriers. In non-power-limited operating scenarios, it would make sense to allow larger payload size and/or support larger user equipment (UE) multiplexing capability for e-PF0. Therefore, there is a need for a solution that introduces increased UE multiplexing capability to existing PUCCH formats. Moreover, there is also a need for a mapping method for interlace to achieve improved maximum coupling loss (MCL).

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus mapping a plurality of mutually orthogonal sequences to each of a plurality of physical resource blocks (PRBs) within an interlace. The method may also involve the processor performing a PUCCH transmission in a NR-U.

In another aspect, a method may involve a processor of an apparatus receiving an assignment of a set of sequences for each PRB of a plurality of PRBs from a wireless network. The method may also involve the processor performing a UCI transmission in a PUCCH in a NR-U.

It is noteworthy that, although description provided herein may be in the context of certain radio access technologies, networks and network topologies such as 5th Generation (5G)/NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, and Internet-of-Things (IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhanced PUCCH format 0 and format 1 design for NR-U operation. According to the present disclosure, a number of possible solutions may be implemented separately or jointly. That is, although these possible solutions may be described below separately, two or more of these possible solutions may be implemented in one combination or another.

Figure 1:
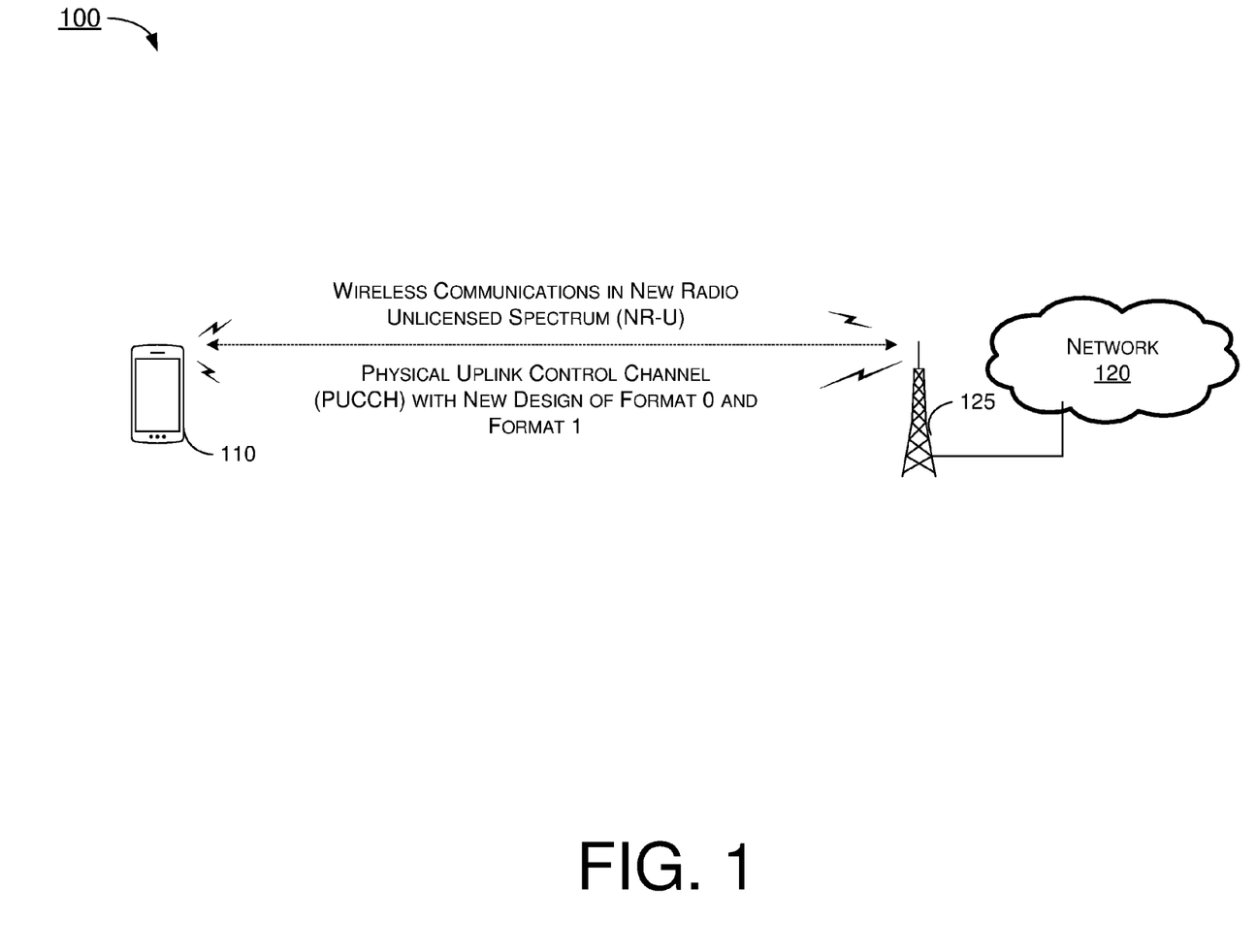
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 communicating wirelessly with a wireless network 120 (e.g., an NR mobile network) via a network node or base station 125 (e.g., gNB, eNB or transmit/receive point (TRP)) in accordance with one or more 3$^{rd}$ Generation Partnership Project (3GPP) specifications. Under various proposed schemes in accordance with the present disclosure, UE 110 and network node 125 may be configured to perform enhanced PUCCH format 0 and format 1 design for NR-U operation in accordance with various proposed schemes described below.

Regarding PUCCH PF0 for NR, twelve different frequency ramps may be applied to a base sequence of length 12 to generate twelve mutually orthogonal sequences. For scheduling request (SR), one of the twelve sequences may be assigned by network node 125 to each of a plurality of UEs (including UE 110) associated with wireless network 120. Thus, a maximum number of UEs supported may be 12. With respect to a one-bit UCI, two sequences may be assigned by network node 125 to each of a plurality of UEs (including UE 110) associated with wireless network 120 to represent {0, 1}. Thus, a maximum number of UEs supported may be 12 / 2 = 6. With respect to a two-bit UCI, four sequences may be assigned by network node 125 to each of a plurality of UEs (including UE 110) associated with wireless network 120 to represent {00, 01, 10, 11}. Thus, a maximum number of UEs supported may be 12 / 4 = 3.

Under a proposed scheme in accordance with the present disclosure, UE 110 and network node 125 may perform operations with respect to mapping sequences to a PUCCH interlace to reduce the peak-to-average power ratio (PAPR) of a transmitted signal. Under the proposed scheme, a low PAPR design may involve mapping a first number (e.g., twelve) of mutually orthogonal sequences {s0, s1, ..., S11} to each of a second number (e.g., ten) of PRBs within an interlace. In some instances, a pure repetition mapping may be performed in that a same sequence may be repeated a number of times (e.g., ten times). For instance, {s0, s0, s0, s0, s0, s0, s0, s0, s0, s0} may be mapped to the ten PRBs of an interlace. However, this design may result in a very large PAPR due to the way the signal is aligned in the time domain. Under the proposed scheme, a number of sequences (e.g., twelve sequences: s0, s1, s2, s3, s4, s5, s6, s7, s8, s9, s10, s11) may be cycled through with some specific, non-zero interval. For illustrative purposes and without limiting the scope of the present disclosure, one example may be {s0, s1, s2, s3, s4, s5, s6, s7, s8, s9} with an interval of 1, and another example may be {s0, s5, s10, s3, s8, s1, s6, s11, s4, s9} with an interval of 5. Under the proposed scheme, the intervals may need to be relatively prime to 12 in order to achieve low PAPR for the resulting signal.

Under another proposed scheme in accordance with the present disclosure, UE 110 and network node 125 may perform operations with respect to mapping sequences to a PUCCH interlace to improve UE multiplexing capability of an interlaced signal. Under the proposed scheme, to support more UEs within a given interlace, a two-bit UCI may be utilized. In a first approach, four sequences may be assigned by network node 125 to each UE of a plurality of UEs (including UE 110) associated with wireless network 120 per PRB to represent {00, 01, 10, 11}. For example and without limiting the scope of the present disclosure, {s0, s1, s2, s3} may be assigned to UE 110. In this approach, the sequences may be different for different PRBs within a given interlace. Accordingly, the maximum number of UEs supportable in the first approach may be 12 / 4 = 3.

In a second approach, two sequences may be assigned by network node 125 to each UE of a plurality of UEs (including UE 110) associated with wireless network 120 per PRB to represent {0, 1}. For example and without limiting the scope of the present disclosure, {s0, s1} may be assigned to UE 110. In this approach, the sequences may be different for different PRBs within a given interlace. Moreover, a (10, 2) binary code may be used to carry the two UCI bits for a given UE. One example of such a code may be {0000000000, 1111111111, 1010101010, 0101010101}, with a minimum Hemming distance ($d_{min}$) = 5. Another example of such a code may be {0000000000, 1111110000, 0000111111, 0111001110}, with $d_{min}$ = 6, which may be better as a greater value of $d_{min}$ may be preferred. In this approach, sequence indexes across the ten PRBs may be optimized to obtain a better PAPR of the waveform. Accordingly, the maximum number of UEs supportable in the first approach may be 12 / 2 = 6. Thus, the number of UEs supported is doubled in the second approach compared to the first approach.

Under a proposed scheme in accordance with the present disclosure, UE 110 and network node 125 may perform operations with respect to mapping sequences to a PUCCH interlace to increase a supported payload size. Under the proposed scheme, to support a UCI with a larger payload size, either of two approaches may be utilized. In a first approach, either a one-bit UCI or a two-bit UCI may be utilized. With a one-bit UCI, two sequences may be assigned by network node 125 to each UE of a plurality of UEs (including UE 110) associated with wireless network 120 per PRB to represent {0, 1}. For example and without limiting the scope of the present disclosure, {s0, s1} may be assigned to UE 110. In this approach, the sequences may be different for different PRBs within a given interlace. Moreover, sequence indexes across the ten PRBs may be optimized to obtain a better PAPR of the waveform. Accordingly, the maximum number of UEs supportable in the first approach may be 12 / 2 = 6.

In the first approach, with a two-bit UCI, two sequences may be assigned by network node 125 to each UE of a plurality of UEs (including UE 110) associated with wireless network 120 per PRB to represent {0, 1}. For example and without limiting the scope of the present disclosure, {s0, s1} may be assigned to UE 110. Additionally, the sequences may be different for different PRBs within a given interlace. Furthermore, a (10, 2) binary code may be used to carry the two UCI bits for a given UE. One example of such a code may be {0000000000, 1111111111, 1010101010, 0101010101}, with a minimum Hemming distance ($d_{min}$) = 5. Another example of such a code may be {0000000000, 1111110000, 0000111111, 0111001110}, with $d_{min}$ = 6, which may be better as a greater value of $d_{min}$ may be preferred. In this approach, sequence indexes across the ten PRBs may be optimized to obtain a better PAPR of the waveform. Accordingly, the maximum number of UEs supportable in the first approach may be 12 / 2 = 6.

In a second approach, either a one-bit UCI or a two-bit UCI may be utilized. With a one-bit UCI, two sequences may be assigned by network node 125 to each UE of a plurality of UEs (including UE 110) associated with wireless network 120 per PRB to represent {0, 1}. For example and without limiting the scope of the present disclosure, {s0, s1} may be assigned to UE 110. In this approach, the sequences may be different for different PRBs within a given interlace. Moreover, sequence indexes across the ten PRBs may be optimized to obtain a better PAPR of the waveform. One example maybe {s0, s1, s2, s3, s4, s5, s6, s7, s8, s9} and another example may be {s1, s2, s3, s4, s5, s6, s7, s8, s9, s10}. Accordingly, the maximum number of UEs supportable in the first approach may be 12 / 2 = 6.

In the second approach, with a two-bit UCI, two sequences may be assigned by network node 125 to each UE of a plurality of UEs (including UE 110) associated with wireless network 120 per PRB to represent {0, 1}. For example and without limiting the scope of the present disclosure, {s0, s1} may be assigned to UE 110. Additionally, the sequences may be different for different PRBs within a given interlace. Under the proposed scheme, different index intervals may be utilized to carry information bits. For example and without limiting the scope of the present disclosure, for an index interval of 1, {s0, s1, s2, s3, s4, s5, s6, s7, s8, s9} may represent 00 and {s1, s2, s3, s4, s5, s6, s7, s8, s9, s10} may represent 01. As another example and without limiting the scope of the present disclosure, for an index interval of 5, {s0, s5, s10, s3, s8, s1, s6, s11, s4, s9} may represent 10 and {s1, s6, s11, s4, s9, s2, s7, s0, s5, s10} may represent 11. Accordingly, the maximum number of UEs supportable in the first approach may be 12 / 2 = 6. Thus, all the signals thus constructed may have a low PAPR.

Illustrative Implementations

Figure 2:
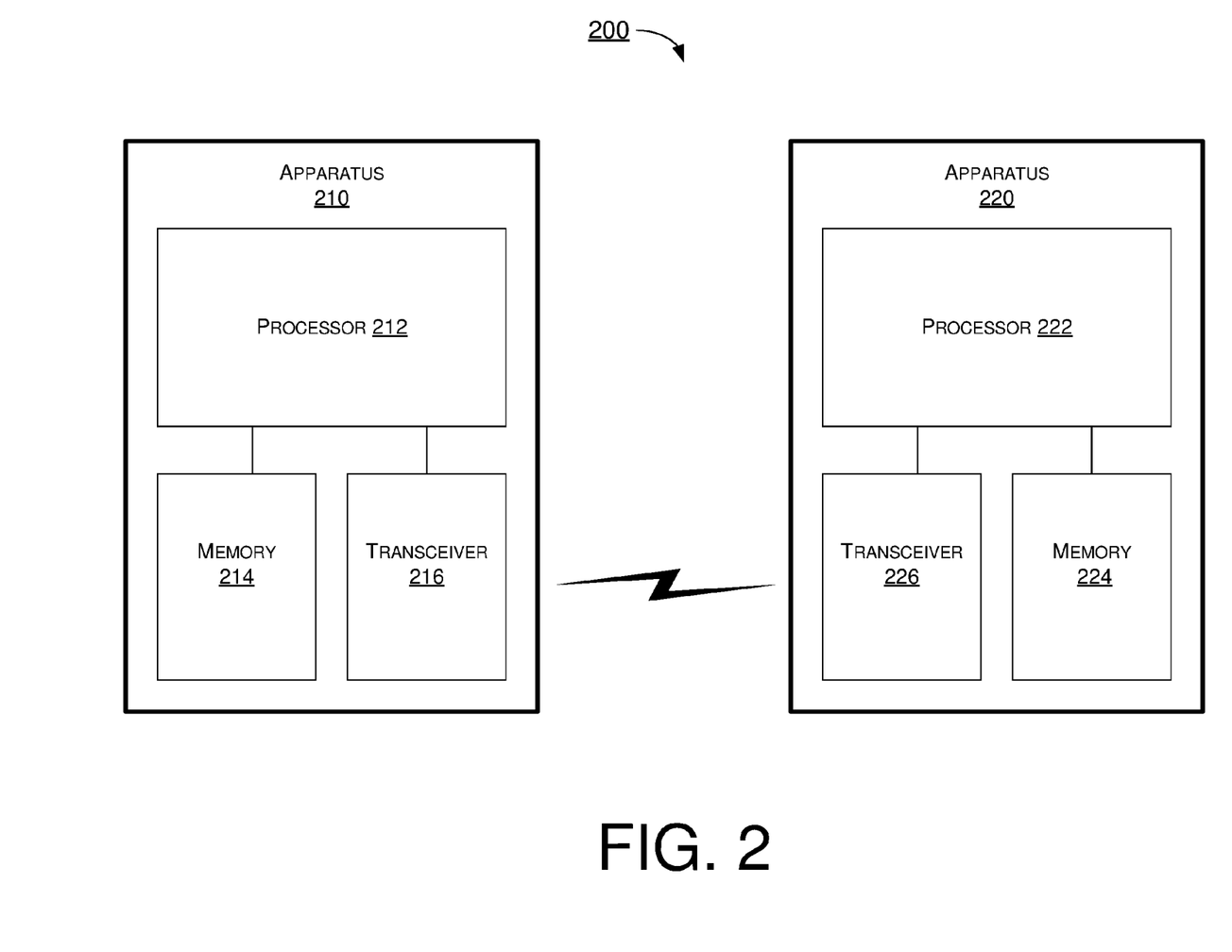
FIG. 2 is a block diagram of an example communication system in accordance with an implementation of the present disclosure.

FIG. 2 illustrates an example system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to enhanced PUCCH format 0 and format 1 design for NR-U operation, including the various schemes described above with respect to various proposed designs, concepts, schemes, systems and methods described above as well as process 200 described below.

Each of apparatus 210 and apparatus 220 may be a part of an electronic apparatus, which may be a network apparatus or a UE, such as a portable or mobile apparatus, a wearable apparatus, a wireless communication apparatus or a computing apparatus. For instance, each of apparatus 210 and apparatus 220 may be implemented in a smartphone, a smart watch, a personal digital assistant, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in a base station, such as an eNB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, one or more RISC processors or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to enhanced PUCCH format 0 and format 1 design for NR-U operation in accordance with various implementations of the present disclosure.

In some implementations, apparatus 210 may also include a transceiver 216 coupled to processor 212. Transceiver 216 may be capable of wirelessly transmitting and receiving data. In some implementations, apparatus 220 may also include a transceiver 226 coupled to processor 222. Transceiver 226 may include a transceiver capable of wirelessly transmitting and receiving data.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (FeRAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE, and apparatus 220, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 210 as a UE, the same is also applicable to apparatus 220 as a network node or base station such as a gNB, TRP or eNodeB of a wireless network such as a 5G NR mobile network.

Under a proposed scheme with respect to enhanced PUCCH format 0 and format 1 design for NR-U operation in accordance with the present disclosure, processor 212 of apparatus 210 may map a plurality of mutually orthogonal sequences to each of a plurality of PRBs within an interlace. Additionally, processor 212 may perform, via transceiver 216, a PUCCH transmission in a NR-U.

In some implementations, in mapping the plurality of mutually orthogonal sequences to each of the plurality of PRBs within the interlace, processor 212 may perform certain operations. For instance, processor 212 may cycle through the plurality of mutually orthogonal sequences with a non-zero interval to result in a set of non-repeating sequences selected from the plurality of mutually orthogonal sequences with the non-zero interval between every two adjacent sequences in the set. Moreover, processor 212 may map the set of non-repeating sequences to the plurality of PRBs within the interlace.

In some implementations, the non-zero interval may be a number prime to 12. In some implementations, in mapping the plurality of mutually orthogonal sequences to each of the plurality of PRBs within the interlace, processor 212 may map 12 mutually orthogonal sequences to each of 10 PRBs within the interlace.

In some implementations, processor 212 may perform additional operations. For instance, processor 212 may receive, via transceiver 216, an assignment of a set of sequences for each PRB of the plurality of PRBs from a wireless network (e.g., from wireless network 120 via apparatus 220 as network node 125). Additionally, processor 212 may perform, via transceiver 216, a UCI transmission in the PUCCH in the NR-U.

In some implementations, in receiving the assignment of the set of sequences for each PRB of the plurality of PRBs, processor 212 may receive the assignment of four sequences for each PRB of the plurality of PRBs to represent {00, 01, 10, 11}. Moreover, different PRBs of the plurality of PRBs may have different sequences from the set of sequences within the interlace. In such cases, in performing the UCI transmission, processor 212 may transmit a two-bit UCI.

In some implementations, in receiving the assignment of the set of sequences for each PRB of the plurality of PRBs, processor 212 may receive the assignment of two sequences for each PRB of the plurality of PRBs to represent {0, 1}. Moreover, different PRBs of the plurality of PRBs may have different sequences from the set of sequences within the interlace. In such cases, in performing the UCI transmission, processor 212 may transmit a one-bit UCI.

In some implementations, in receiving the assignment of the set of sequences for each PRB of the plurality of PRBs, processor 212 may receive the assignment of two sequences for each PRB of the plurality of PRBs to represent {0, 1}. Moreover, different PRBs of the plurality of PRBs may have different sequences from the set of sequences within the interlace. In such cases, in performing the UCI transmission, processor 212 may transmit a two-bit UCI.

In some implementations, in transmitting the two-bit UCI, processor 212 may transmit the two-bit UCI by using a (10, 2) binary code to carry the two-bit UCI.

In some implementations, in transmitting the two-bit UCI, processor 212 may perform certain operations. For instance, for each of four permutations of two bits comprising 00, 01, 10 and 11 for the two-bit UCI, processor 212 may cycle through the set of sequences with a respective non-zero interval to result in a subset of non-repeating sequences selected from the set of sequences with the respective non-zero interval between every two adjacent sequences in the subset. Additionally, processor 212 may transmit the subset of non-repeating sequences as the two-bit UCI. In such cases, the respective non-zero interval may be a number prime to 12.

Under another proposed scheme with respect to enhanced PUCCH format 0 and format 1 design for NR-U operation in accordance with the present disclosure, processor 212 of apparatus 210 may receive, via transceiver 216, an assignment of a set of sequences for each PRB of a plurality of PRBs from a wireless network (e.g., from wireless network 120 via apparatus 220 as network node 125). Moreover, processor 212 may perform, via transceiver 216, a UCI transmission via a PUCCH in a NR-U.

In some implementations, in receiving the assignment of the set of sequences for each PRB of the plurality of PRBs, processor 212 may receive the assignment of four sequences for each PRB of the plurality of PRBs to represent {00, 01, 10, 11}. Moreover, different PRBs of the plurality of PRBs may have different sequences from the set of sequences within the interlace. In such cases, in performing the UCI transmission, processor 212 may transmit a two-bit UCI.

In some implementations, in receiving the assignment of the set of sequences for each PRB of the plurality of PRBs, processor 212 may receive the assignment of two sequences for each PRB of the plurality of PRBs to represent {0, 1}. Moreover, different PRBs of the plurality of PRBs may have different sequences from the set of sequences within the interlace. In such cases, in performing the UCI transmission, processor 212 may transmit a one-bit UCI.

In some implementations, in receiving the assignment of the set of sequences for each PRB of the plurality of PRBs, processor 212 may receive the assignment of two sequences for each PRB of the plurality of PRBs to represent {0, 1}. Moreover, different PRBs of the plurality of PRBs may have different sequences from the set of sequences within the interlace. In such cases, in performing the UCI transmission, processor 212 may transmit a two-bit UCI.

In some implementations, in transmitting the two-bit UCI, processor 212 may transmit the two-bit UCI by using a (10, 2) binary code to carry the two-bit UCI.

In some implementations, in transmitting the two-bit UCI, processor 212 may perform certain operations. For instance, for each of four permutations of two bits comprising 00, 01, 10 and 11 for the two-bit UCI, processor 212 may cycle through the set of sequences with a respective non-zero interval to result in a subset of non-repeating sequences selected from the set of sequences with the respective non-zero interval between every two adjacent sequences in the subset. Additionally, processor 212 may transmit the subset of non-repeating sequences as the two-bit UCI. In such cases, the respective non-zero interval may be a number prime to 12.

In some implementations, processor 212 may perform additional operations. For instance, processor 212 may map, via transceiver 216, a plurality of mutually orthogonal sequences to each of the plurality of PRBs within an interlace by: (a) cycling through the plurality of mutually orthogonal sequences with a non-zero interval to result in a set of non-repeating sequences selected from the plurality of mutually orthogonal sequences with the non-zero interval between every two adjacent sequences in the set; and (b) mapping the set of non-repeating sequences to the plurality of PRBs within the interlace. Moreover, processor 212 may perform, via transceiver 216, a PUCCH transmission in the NR-U.

In some implementations, the non-zero interval may be a number prime to 12. In such cases, in mapping the plurality of mutually orthogonal sequences to each of the plurality of PRBs within the interlace, processor 212 may map 12 mutually orthogonal sequences to each of 10 PRBs within the interlace.

Illustrative Processes

Figure 3:
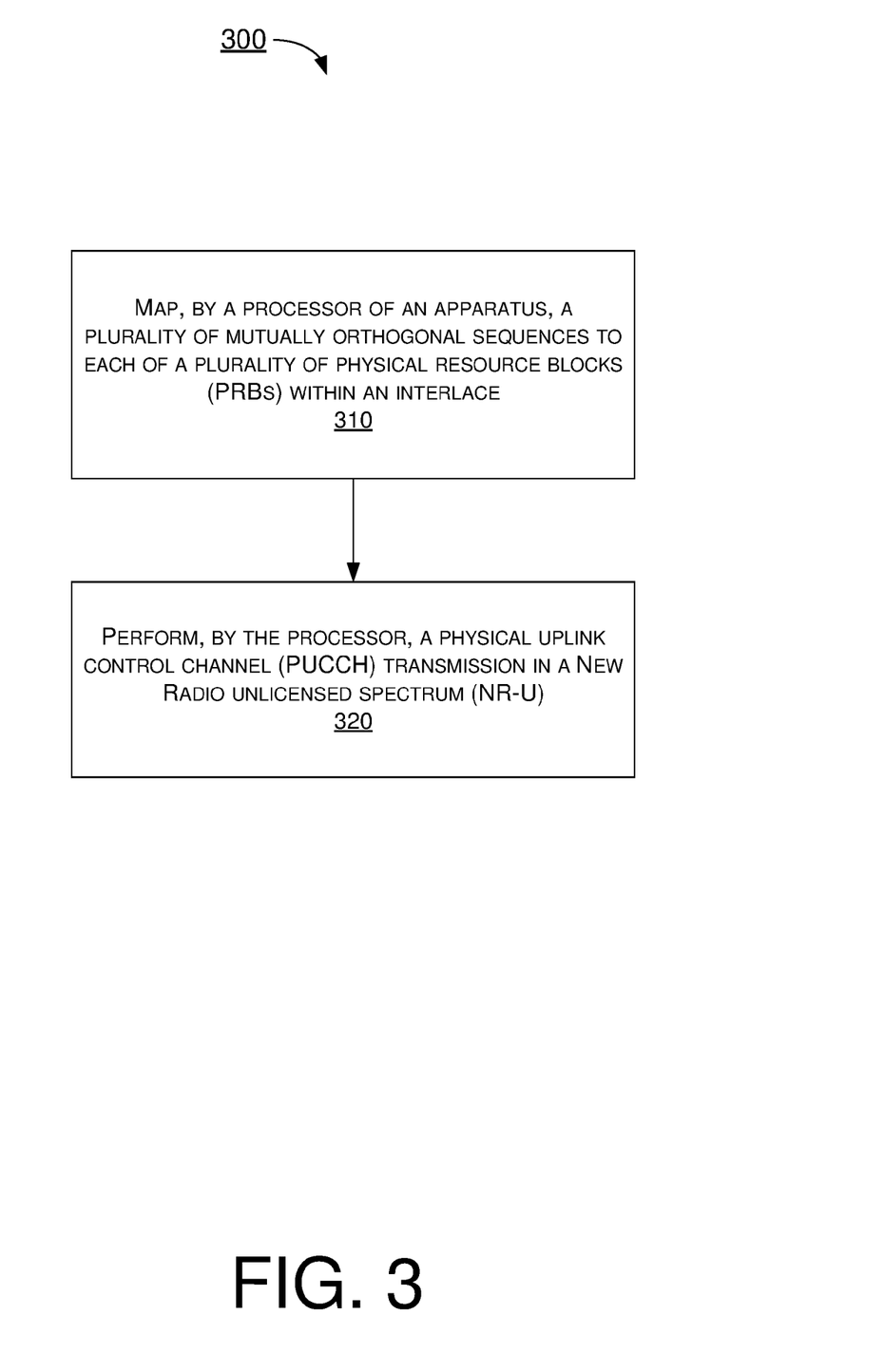
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above. More specifically, process 300 may represent an aspect of the proposed concepts and schemes pertaining to enhanced PUCCH format 0 and format 1 design for NR-U operation. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed repeatedly or iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a base station or network node (e.g., network node 125) of a wireless network (e.g., wireless network 120) such as a 3G/NR mobile network. Process 300 may begin at block 310.

At 310, process 300 may involve processor 212 of apparatus 210 mapping a plurality of mutually orthogonal sequences to each of a plurality of PRBs within an interlace. Process 300 may proceed from 310 to 320.

At 320, process 300 may involve processor 212 performing, via transceiver 216, a PUCCH transmission in a NR-U.

In some implementations, in mapping the plurality of mutually orthogonal sequences to each of the plurality of PRBs within the interlace, process 300 may involve processor 212 performing certain operations. For instance, process 300 may involve processor 212 cycling through the plurality of mutually orthogonal sequences with a non-zero interval to result in a set of non-repeating sequences selected from the plurality of mutually orthogonal sequences with the non-zero interval between every two adjacent sequences in the set. Moreover, process 300 may involve processor 212 mapping the set of non-repeating sequences to the plurality of PRBs within the interlace.

In some implementations, the non-zero interval may be a number prime to 12. In some implementations, in mapping the plurality of mutually orthogonal sequences to each of the plurality of PRBs within the interlace, process 300 may involve processor 212 mapping 12 mutually orthogonal sequences to each of 10 PRBs within the interlace.

In some implementations, process 300 may involve processor 212 performing additional operations. For instance, process 300 may involve processor 212 receiving, via transceiver 216, an assignment of a set of sequences for each PRB of the plurality of PRBs from a wireless network (e.g., from wireless network 120 via apparatus 220 as network node 125). Additionally, process 300 may involve processor 212 performing, via transceiver 216, a UCI transmission in the PUCCH in the NR-U.

In some implementations, in receiving the assignment of the set of sequences for each PRB of the plurality of PRBs, process 300 may involve processor 212 receiving the assignment of four sequences for each PRB of the plurality of PRBs to represent {00, 01, 10, 11}. Moreover, different PRBs of the plurality of PRBs may have different sequences from the set of sequences within the interlace. In such cases, in performing the UCI transmission, process 300 may involve processor 212 transmitting a two-bit UCI.

In some implementations, in receiving the assignment of the set of sequences for each PRB of the plurality of PRBs, process 300 may involve processor 212 receiving the assignment of two sequences for each PRB of the plurality of PRBs to represent {0, 1}. Moreover, different PRBs of the plurality of PRBs may have different sequences from the set of sequences within the interlace. In such cases, in performing the UCI transmission, process 300 may involve processor 212 transmitting a one-bit UCI.

In some implementations, in receiving the assignment of the set of sequences for each PRB of the plurality of PRBs, process 300 may involve processor 212 receiving the assignment of two sequences for each PRB of the plurality of PRBs to represent {0, 1}. Moreover, different PRBs of the plurality of PRBs may have different sequences from the set of sequences within the interlace. In such cases, in performing the UCI transmission, process 300 may involve processor 212 transmitting a two-bit UCI.

In some implementations, in transmitting the two-bit UCI, process 300 may involve processor 212 transmitting the two-bit UCI by using a (10, 2) binary code to carry the two-bit UCI.

In some implementations, in transmitting the two-bit UCI, process 300 may involve processor 212 performing certain operations. For instance, for each of four permutations of two bits comprising 00, 01, 10 and 11 for the two-bit UCI, process 300 may involve processor 212 cycling through the set of sequences with a respective non-zero interval to result in a subset of non-repeating sequences selected from the set of sequences with the respective non-zero interval between every two adjacent sequences in the subset. Additionally, process 300 may involve processor 212 transmitting the subset of non-repeating sequences as the two-bit UCI. In such cases, the respective non-zero interval may be a number prime to 12.

Figure 4:
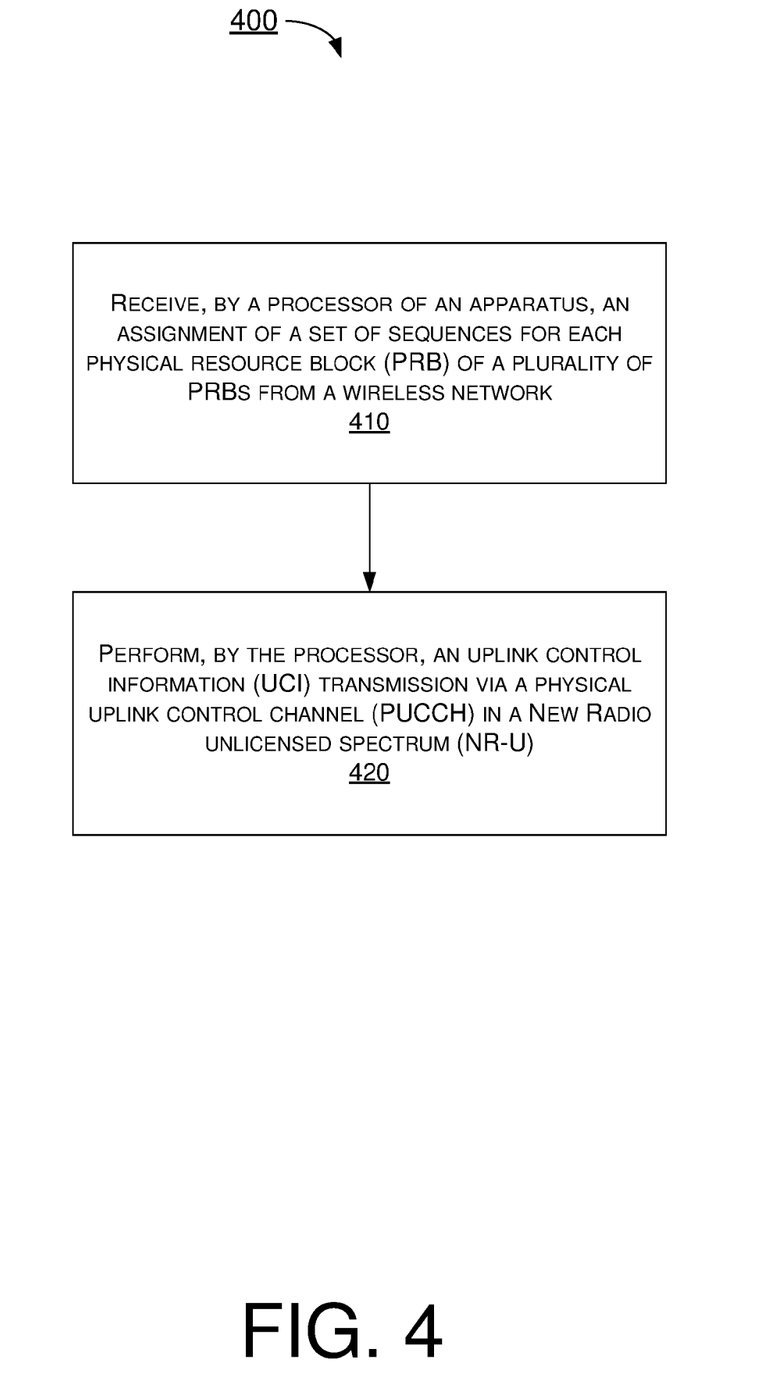
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above. More specifically, process 400 may represent an aspect of the proposed concepts and schemes pertaining to enhanced PUCCH format 0 and format 1 design for NR-U operation. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed repeatedly or iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a base station or network node (e.g., network node 125) of a wireless network (e.g., wireless network 120) such as a 4G/NR mobile network. Process 400 may begin at block 410.

At 410, process 400 may involve processor 212 of apparatus 210 receiving, via transceiver 216, an assignment of a set of sequences for each PRB of a plurality of PRBs from a wireless network (e.g., from wireless network 120 via apparatus 220 as network node 125). Process 400 may proceed from 410 to 420.

At 420, process 400 may involve processor 212 performing, via transceiver 216, a UCI transmission via a PUCCH in a NR-U.

In some implementations, in receiving the assignment of the set of sequences for each PRB of the plurality of PRBs, process 400 may involve processor 212 receiving the assignment of four sequences for each PRB of the plurality of PRBs to represent {00, 01, 10, 11}. Moreover, different PRBs of the plurality of PRBs may have different sequences from the set of sequences within the interlace. In such cases, in performing the UCI transmission, process 400 may involve processor 212 transmitting a two-bit UCI.

In some implementations, in receiving the assignment of the set of sequences for each PRB of the plurality of PRBs, process 400 may involve processor 212 receiving the assignment of two sequences for each PRB of the plurality of PRBs to represent {0, 1}. Moreover, different PRBs of the plurality of PRBs may have different sequences from the set of sequences within the interlace. In such cases, in performing the UCI transmission, process 400 may involve processor 212 transmitting a one-bit UCI.

In some implementations, in receiving the assignment of the set of sequences for each PRB of the plurality of PRBs, process 400 may involve processor 212 receiving the assignment of two sequences for each PRB of the plurality of PRBs to represent {0, 1}. Moreover, different PRBs of the plurality of PRBs may have different sequences from the set of sequences within the interlace. In such cases, in performing the UCI transmission, process 400 may involve processor 212 transmitting a two-bit UCI.

In some implementations, in transmitting the two-bit UCI, process 400 may involve processor 212 transmitting the two-bit UCI by using a (10, 2) binary code to carry the two-bit UCI.

In some implementations, in transmitting the two-bit UCI, process 400 may involve processor 212 performing certain operations. For instance, for each of four permutations of two bits comprising 00, 01, 10 and 11 for the two-bit UCI, process 400 may involve processor 212 cycling through the set of sequences with a respective non-zero interval to result in a subset of non-repeating sequences selected from the set of sequences with the respective non-zero interval between every two adjacent sequences in the subset. Additionally, process 400 may involve processor 212 transmitting the subset of non-repeating sequences as the two-bit UCI. In such cases, the respective non-zero interval may be a number prime to 12.

In some implementations, process 400 may involve processor 212 performing additional operations. For instance, process 400 may involve processor 212 mapping, via transceiver 216, a plurality of mutually orthogonal sequences to each of the plurality of PRBs within an interlace by: (a) cycling through the plurality of mutually orthogonal sequences with a non-zero interval to result in a set of non-repeating sequences selected from the plurality of mutually orthogonal sequences with the non-zero interval between every two adjacent sequences in the set; and (b) mapping the set of non-repeating sequences to the plurality of PRBs within the interlace. Moreover, process 400 may involve processor 212 performing, via transceiver 216, a PUCCH transmission in the NR-U.

In some implementations, the non-zero interval may be a number prime to 12. In such cases, in mapping the plurality of mutually orthogonal sequences to each of the plurality of PRBs within the interlace, process 400 may involve processor 212 mapping 12 mutually orthogonal sequences to each of 10 PRBs within the interlace.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   mapping, by a processor of an apparatus, a plurality of mutually orthogonal sequences to each of a plurality of physical resource blocks (PRBs) within an interlace; and
   performing, by the processor, a physical uplink control channel (PUCCH) transmission in a New Radio unlicensed spectrum (NR-U),
   wherein the mapping of the plurality of mutually orthogonal sequences to each of the plurality of PRBs within the interlace comprises:
      cycling through the plurality of mutually orthogonal sequences with a non-zero interval to result in a set of non-repeating sequences selected from the plurality of mutually orthogonal sequences with the non-zero interval between every two adjacent sequences in the set; and
      mapping the set of non-repeating sequences to the plurality of PRBs within the interlace, and
   wherein the non-zero interval comprises a number relatively prime or co-prime to 12.

2. The method of claim 1, wherein the non-zero interval is equal to 5.

3. The method of claim 1, wherein the mapping of the plurality of mutually orthogonal sequences to each of the plurality of PRBs within the interlace comprises mapping 12 mutually orthogonal sequences to each of 10 PRBs within the interlace.

4. The method of claim 1, further comprising:
   receiving, by the processor, an assignment of a set of sequences for each PRB of the plurality of PRBs from a wireless network; and
   performing, by the processor, an uplink control information (UCI) transmission in the PUCCH in the NR-U.

5. The method of claim 4, wherein the receiving of the assignment of the set of sequences for each PRB of the plurality of PRBs comprises receiving the assignment of four sequences for each PRB of the plurality of PRBs to represent {00, 01, 10, 11}, wherein different PRBs of the plurality of PRBs have different sequences from the set of sequences within the interlace, and wherein the performing of the UCI transmission comprises transmitting a two-bit UCI.

6. The method of claim 4, wherein the receiving of the assignment of the set of sequences for each PRB of the plurality of PRBs comprises receiving the assignment of two sequences for each PRB of the plurality of PRBs to represent {0, 1}, wherein different PRBs of the plurality of PRBs have different sequences from the set of sequences within the interlace, and wherein the performing of the UCI transmission comprises transmitting a one-bit UCI.

7. The method of claim 5, wherein the receiving of the assignment of the set of sequences for each PRB of the plurality of PRBs comprises receiving the assignment of two sequences for each PRB of the plurality of PRBs to represent {0, 1}, wherein different PRBs of the plurality of PRBs have different sequences from the set of sequences within the interlace, and wherein the performing of the UCI transmission comprises transmitting a two-bit UCI.

8. The method of claim 7, wherein the transmitting of the two-bit UCI comprises transmitting the two-bit UCI by using a (10, 2) binary code to carry the two-bit UCI.

9. The method of claim 7, wherein the transmitting of the two-bit UCI comprises:
   for each of four permutations of two bits comprising 00, 01, 10 and 11 for the two-bit UCI, cycling through the set of sequences with a respective non-zero interval to result in a subset of non-repeating sequences selected from the set of sequences with the respective non-zero interval between every two adjacent sequences in the subset; and
   transmitting the subset of non-repeating sequences as the two-bit UCI.

10. The method of claim 9, wherein the respective non-zero interval comprises a number relatively prime or co-prime to 12.

* * * * *